United States Patent [19]

Aguilera, Jr. et al.

[11] Patent Number: 5,072,109

[45] Date of Patent: Dec. 10, 1991

[54] PHOTOCELL ARRAY WITH MULTI-SPECTRAL FILTER

[76] Inventors: John A. Aguilera, Jr., 3203 Broken Twig La., Santa Rosa, Calif. 95404; William M. Robbins, 221 Adobe Canyon Rd., Kenwood, Calif. 95452; Richard P. Shimshock, 819 Link La., Santa Rosa, Calif. 95401; Leroy A. Bartolomei, 540 Buena Vista Dr., Santa Rosa, Calif. 95404

[21] Appl. No.: 490,043

[22] Filed: Mar. 7, 1990

[51] Int. Cl.$^5$ .............................................. G01J 3/50
[52] U.S. Cl. ..................................... 250/226; 359/359
[58] Field of Search ...................... 250/226; 357/30 L; 350/1.6, 313, 164–166; 356/418, 419

[56] References Cited

U.S. PATENT DOCUMENTS

| | | |
|---|---|---|
| 2,999,034 | 9/1961 | Heidenhain . |
| 3,585,286 | 6/1971 | Macovski . |
| 3,619,041 | 11/1971 | Willoughby . |
| 3,771,857 | 11/1973 | Thomasson et al. . |
| 4,756,602 | 7/1988 | Southwell et al. .................. 350/1.6 |
| 4,769,11 | 10/1988 | Sadowsky . |
| 4,822,998 | 4/1989 | Yokota et al. ...................... 250/226 |
| 4,827,118 | 5/1989 | Shibata et al. ..................... 250/226 |
| 4,952,025 | 8/1990 | Gunning, III ...................... 350/164 |
| 4,956,555 | 9/1990 | Woodberry ........................ 250/226 |

Primary Examiner—David C. Nelms
Assistant Examiner—K. Shami
Attorney, Agent, or Firm—Malcolm B. Wittenberg

[57] ABSTRACT

An optical thin film filter for the spatial and spectral separation of two or more transmitting bands of radiant energy. For a two band filter the filter has a substrate substantially transparent to radiant energy in the transmitted bands. On one surface of said substrate is a multilayer interference coating that transmits both wavelength bands of interest. On the other surface of said substrate (or on the same surface) are two sets of non-overlapping butted, parallel stripes with one set being alternately interspersed with the other. The widths of said stripes are varied to provide for precisely defined regions of spatial and spectral delineation. One set of stripes is capable of transmitting one of the bands of interest and reflecting all others, while the second set of stripes is capable of transmitting at least one band different from the one band transmitted by said first set of stripes and reflecting all others. Each of the stripes in itself is a multilayer interference coating formed of a plurality of high and low index of refraction materials.

10 Claims, 10 Drawing Sheets

PHOTOCELL ARRAY WITH MULTI-SPECTRAL FILTER

TECHNICAL FIELD OF THE INVENTION

The invention relates to the field of design and fabrication of multicolor (multiple wavelength band), thin film wavelength discriminating optical filters and their use in connection with detectors or detector arrays.

DESCRIPTION OF PRIOR ART

Optical systems typically consist of various collecting and focusing optics, spectral discriminating filters, and detectors for measuring the radiant energy being collected and focused by the optical portion of the system. Increasing demands for improved signal-to-noise and signal processing capability are driving sensor systems to use staring mosaic arrays rather than a conventional scanning approach. Providing spectral filtering for these staring systems is complicated by the requirement that spectral discrimination be provided in discrete spatial regions. If the optical system is also required to collect radiant energy in more than one spectral band the optical system becomes very complex as every detector or detector array must have a discrete wavelength discriminating filter placed over it. Rather complex beam steering optics or dichroic beam splitters are also required to direct the radiant energy onto the appropriate group of detectors. These additions to an optical system add considerable weight and complexity to the system thereby reducing reliability and performance while increasing system costs.

Some efforts to place discriminating filter coatings directly upon the active surface of the detectors have been attempted with very little real success. The biggest problem with this approach is one of imposing an intrinsically low yield thin film coating process upon an intrinsically low yield, high value detector process. Associated yield and cost make this an impractical solution to the problem.

With the advent of large mosaic detector arrays the problem of providing wavelength discrimination has become more acute. For single wavelength sensors a large single discriminating filter can be placed over the entire detector array. However, for multicolor arrays there has been no easy way to provide wavelength discrimination in discrete spatial zones to date. It is a formidable undertaking to place discrete optical discrimination filters over each discrete detector element due to the very small physical dimensions of such detectors, and the process and temperature limitations imposed by the fragile detector elements. Previous attempts to build a patterned coating which alternatively passes the different wavelength bands of interest have met with limited success even for relatively simple filter requirements. For sophisticated filter requirements that require greater film thickness to produce precise spectral discrimination and the attendant lower coating yields, this approach becomes impractical due to the technical difficulty and high cost associated with patterning thick multilayer interference coatings. This problem is further aggravated by the size of the pattern relative to the thickness of the multilayer coating, with the difficulty increasing substantially as the dimension(s) of the pattern approach the thickness of the filter coating.

As taught in U.S. Pat. No. 3,771,857, lift off is the common method for patterning hard multilayer interference coatings. In this method for forming the patterned multilayer interference filter, spaced parallel stripes of a material such as photoresist or metal are formed on a substrate in thickness greater than the total physical thickness of the multilayer interference coating to be patterned. Coating materials are deposited on the stripes and on the surface to a depth which is insufficient to cover the side walls of the stripes so as to provide a discontinuity in the multilayer coating to facilitate removal of the stripes after the dielectric multilayer coating is deposited. The photoresist material is then etched away, thus lifting off the coating material carried by the stripes so that there remains a first set of spaced parallel stripes of the multilayer coating on the substrate. This technique is repeated for additional multilayer interference filter patterns.

The problem with patterning very thick coatings, e.g. greater than 5 micrometers, using this method stems from the severe problems associated with obtaining thick, adherent, well defined patterns of a suitable material such as photoresist that is stable at the temperatures and pressures typically involved in multilayer thin film deposition processes. Since spectral filters of the type addressed herein are typically on the order of 15 micrometers to 20 micrometers thick, the production of such coatings, in patterns whose width approaches the coating's thickness, requiring good coating uniformity out to the edge of the pattern, are nearly impossible to fabricate using conventional technology.

In summary, optical systems employing more than one radiant wavelength band detection can be greatly simplified if a means can be found to spatially and spectrally separate the incoming radiant energy into the appropriate wavelength bands of interest using a single refractive substrate element. This allows a more tightly packed focal plane array which minimizes cooling and mechanical support to the focal plane while reducing overall focal plane costs. This results in a higher performing and more reliable sensor.

Therefore, there is a need for a new and improved method for fabricating multicolor, thin film wavelength discriminating optical filters due to the very low yields and resultant high cost of placing discrete optical discrimination filters over each discrete detector element and for fabricating a patterned coating which alternatively passes the different wavelength bands of interest.

The multicolor, thin film wavelength discriminating optical filter of the present invention comprises a substrate that is substantially transparent to radiant energy at the wavelength bands of interest and has at least one surface for receiving coatings. A first coating capable of transmitting two or more spectral bands of interest while reflecting and/or absorbing all out of band wavelengths (those wavelengths which are not of interest) is provided on one surface of the substrate. First and second photolithographic patterned coatings, typically parallel stripes, are also provided in the radiant energy pathway. Both photolithographic patterned coatings are capable of reflecting all wavelength bands but one spectral band transmitted by the first coating. These photolithographic patterned coatings are provided on a surface of the substrate, in either of two alternate configurations: the opposite surface from the first coating, or the first coating is applied directly on top of the two photolithographic patterned coatings. If desired, additional photolithographic patterned coatings, each capable of transmitting at least one wavelength band different from said first and second patterned coatings while reflecting all other wavelength bands transmitted by said first surface coating can also be provided where three or more colors are required.

In general, it is an object of the present invention to provide a multicolor, thin film wavelength discriminating optical filter that comprises a continuous multicolor (multiband transmitting) filter in series or combination with two or more reflecting (photolithographic patterned) filters in which the filters are formed by a plurality of high and low index dielectric materials arranged in multiple layers (optical switch coating).

Another object of the invention is to provide a filter of the above character on a single surface of the substrate in which said filter is designed to transmit two or more spectral bands of interest while reflecting and/or absorbing required out of band wavelengths (multicolor filter) and additional filters on the second substrate surface each consist of a set of parallel, butted and non-overlapping stripes capable of transmitting at least one color different from the other set of stripes while reflecting all other colors (optical switch coating).

Another object of the present invention is to provide a multicolor filter of the above character on one surface of the substrate in order to reduce the thickness and complexity of optical switch coatings that could be patterned on a second surface, or the optical switch coatings filter can be applied directly over individual detectors so as to provide a cost effective means for spatial and spectral separation of two or more wavelength bands of radiant energy.

Another object of the invention is to provide a multicolor filter of the above character on the same surface of the substrate and directly on top of patterned optical switch coatings so as to provide a cost effective means for spatial and spectral separation of two or more bands of radiant energy.

Another object of the invention is to provide a multicolor filter on one surface of the substrate that is modular in design with each module designed to match the refractive index of air at each interface between modules.

Another object of the invention is to provide a multicolor filter on one surface of the substrate that consists of a short wavelength transmission band module, a medium or long wavelength transmission band module, and a common blocking (out of band reflection and/or absorption) band module.

Another object of the present invention is to provide a filter of the above character in which said multicolor filter is applied directly to one or both surfaces of a refractive element and each "optical switch coating" is applied directly to an appropriate detector, said optical switch coatings reflecting all but one wavelength band transmitted by the multicolor filter.

Another object of the invention is to provide a filter of the above character in which all but one of the transmitted wavelength bands is reflected by a discrete reflecting filter, with at least two discrete reflecting filters being mounted in a filter wheel such that individual wavelength bands of interest can be provided by selecting the appropriate discrete reflecting filter.

Another object of the invention is to provide a filter of the above character in which more than one photolithographic patterned coating is provided on the second surface of the substrate with each pattern being deposited parallel to the other set of stripes.

Another object of the invention is to provide for ease of varying the stripe widths, or pattern of the optical switch module, to precisely match the mosaic focal plane detector array without impacting the spectral performance of the multicolor filter.

Another object of the invention is to provide a filter of the above character in which the sets of parallel stripes are disposed on the same surface of the substrate.

Another object of the invention is to provide a filter of the above character in which the first surface continuous coating in conjunction with second surface stripes provides good spectral performance.

Another object of the invention is to provide a filter of the above character in which each set of parallel stripes is capable of transmitting at least one band different from the other sets of stripes while rejecting all other bands.

Another object of the invention is to provide a filter of the above character in which each photolithographic pattern is capable of modifying the transmission of at least one wavelength band different from the other photolithographic pattern while reflecting and/or absorbing all other bands.

Another object of the invention is to provide a filter of the above character in which high stripe densities can be obtained.

Another object of the invention is to provide a filter of the above character in which the transition between stripes is minimized.

Another object of the invention is to provide a filter of the above character in which the patterned reflecting coatings are in patterns other than stripes.

Another object of the invention is to provide a fabrication method of the above character which is repeatable.

Another object of the invention is to provide a fabrication method of the above character which has high yield.

Another object of the invention is to provide a fabrication method of the above character which is robust and provides wide processing tolerances.

Another object of the invention is to provide an optical filter design methodology in which the coating design or designs do not use the conventional periodic structure, but use a highly refined structure with individual layer thicknesses precisely determined and established to provide optimum spectral performance and manufacturability.

Another object of the invention is to provide an optical element which minimizes cross talk between the different transmission bands.

Another object of the invention is to provide a filter of the above character in combination with at least one patterned or discrete reflecting filter and at least one detector that detects only one band that is transmitted by the multiband filter.

Additional objects and features of the invention will appear from the following description in which the preferred embodiments are set forth in detail in conjunction with the accompanying drawing.

SUMMARY OF THE INVENTION

This invention provides a solution to the spectral and spatial separation of two or more radiant wavelength bands with a single refractive element.

In a particular embodiment, a first coating is deposited on the surface of an appropriate substrate providing wavelength discrimination of two or more discrete radiant bands. A wavelength attenuation, or blocking coating which is common to all wavelength bands is also placed upon this same substrate surface. Upon the opposite substrate surface is provided at least one photolithographic patterned coating which passes the appropriate wavelength(s) of interest while reflecting and/or absorbing all other out of band wavelengths transmitted by the first coating.

An alternative to providing the wavelength discrimination coating on the opposite surface from the photolithographic patterned coating is to provide the wavelength discrimination coating directly on top of the photolithographic patterned coating. With either of these alternative techniques, the thickness of the coatings to be patterned can be kept to a minimum, greatly facilitating the coating patterning process. In addition, the reflective "switch" type coatings typically have significantly higher coating yields than wavelength discrimination coatings because the tolerances for these coatings are not as stringent as those required for wavelength discrimination.

In another embodiment, the photolithographic patterned coatings are not required, and instead relatively simple separation coatings are placed directly upon the detector surfaces themselves. As these coatings represent a high yield process there is an overall acceptable yield resulting from the combined detector/separation coating processes. The coated detectors are then used in combination with the multicolor filter coated substrate.

In another embodiment, discrete filters can be placed in a filter wheel or some other suitable filter holding and indexing device. For this case the reflecting coatings can be designed to not only transmit one band while reflecting and/or absorbing all others, but to also modify the band that is to be transmitted.

In another embodiment, the photolithographic patterned coatings deposited on the substrate are not designed to transmit one wavelength band different from all other bands, but to modify a single wavelength band different from the others while, reflecting and/or absorbing all other wavelengths transmitted by the multicolor continuous coating.

In another embodiment, a continuous first coating is deposited upon one surface of a substrate which is a wide band transmitting coating, characterized by short wavelength edge and long wavelength edge of the transmission band being one edge of two distinct and different colors. The wide band continuous first coating also provides required out of band blocking. Upon a second surface of the substrate, two photolithographic patterned coatings are deposited, capable of providing the second transmission edge for a single color while reflecting and/or absorbing all other wavelengths transmitted by the wide band continuous coating.

In another embodiment, a continuous first coating is deposited upon one surface of a substrate which is a wide band transmitting coating, characterized by short wavelength edge and long wavelength edge of the transmission band being one edge of two distinct and different colors. The wide band continuous first coating also provides required out of band blocking. Coatings are alternatively provided on top of individual detectors which provide the transmission edge for one color while reflecting and/or absorbing all other wavelengths transmitted by the wide band continuous coating.

DETAILED DESCRIPTION OF THE PREFERRED EMBODIMENTS

Figure 1:
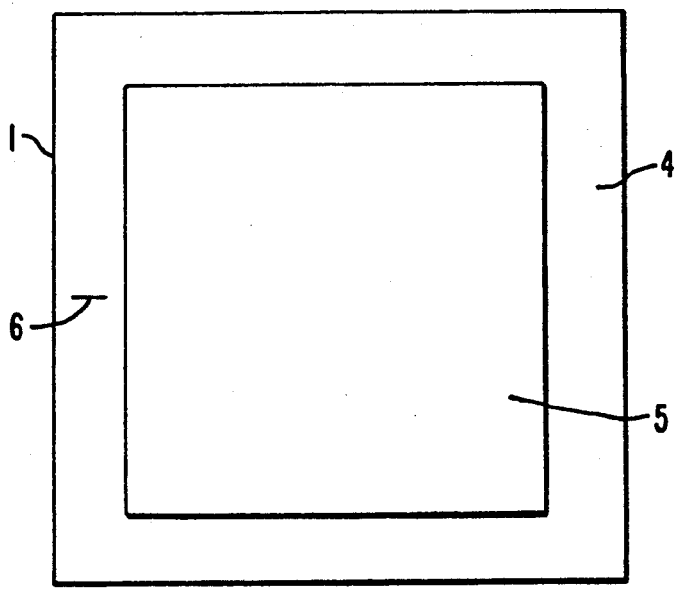
FIG. 1 is a plan view of a multicolor, thin film wavelength discriminating optical filter incorporating the present invention.
Figure 2:
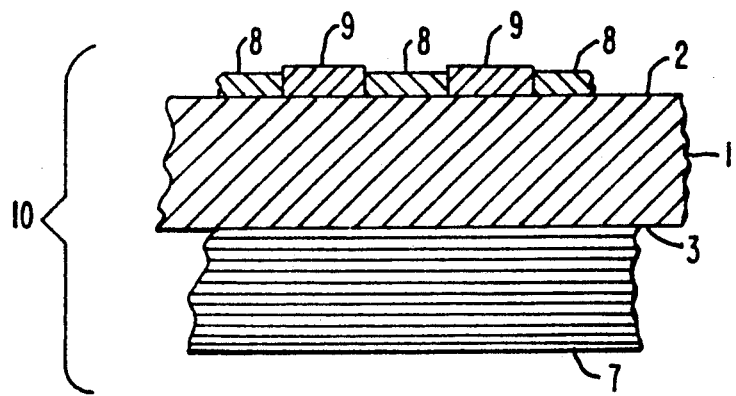
FIG. 2 is a sectioned edge view of a multicolor, thin film wavelength discriminating optical filter incorporating the present invention.
Figure 3:
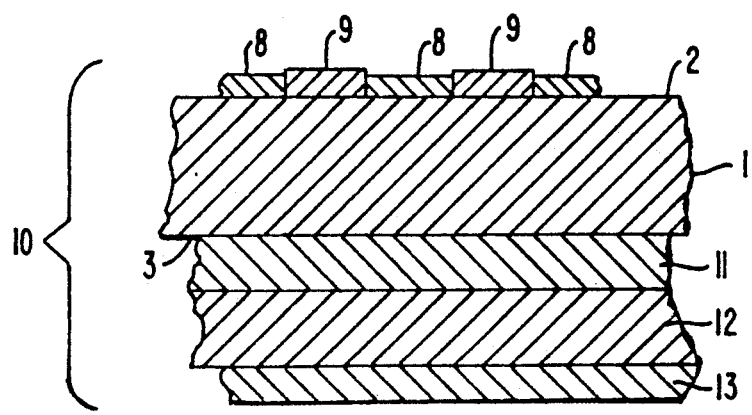
FIG. 3 is a sectioned edge view of a multicolor, thin film wavelength discriminating optical filter where the multicolor continuous coating is made up of three discrete thin film modules with the interface between multilayer coating stacks being matched to the index of refraction of air so as to facilitate design and process analysis and control, and to allow minor changes in spectral performance of a single wavelength band to be made without impacting the performance of the other band(s).

FIGS. 1, 2, and 3 show a multicolor, thin film wavelength discriminating optical filter incorporating the present invention. As shown therein, the filter consists of a substrate 1 which is substantially transparent at the spectral wavelengths of interest. In a preferred embodiment, it is germanium supplied by Eagle-Pitcher Industries or silicon supplied by Silicon Castings. The substrate 1 is provided with two spaced parallel surfaces 2 and 3 which are highly polished (B—B per MIL-F-48616 over the entire surface, for example) and are very flat (less than 3 visible fringes flat and less than 1 visible fringe irregular over a rectangular area of the part). The substrate 1 can have any desired size. For example, it can have a width of approximately 2.1 inches, a length of approximately 2.5 inches and a thickness of approximately 0.1 inches.

Parallel-stripe coating 5 is deposited on the surface 2 and forms the alternating short wavelength and long wavelength reflectors 8 and 9 as hereinafter described. As will be noted, the coating 5 does not cover the entire surface 2 but is limited so that an outer border region 4 of the surface 2 remains uncoated. A fiducial mark 6 is provided on the substrate 1 and is located on the surface 2. The fiducial mark may be applied in any desired manner such as by scribing, painting, etching, and the like. The fiducial mark 6 is utilized in aligning each parallel stripe with the appropriate detector type in operation.

One method by which the coating 5 is formed on the substrate 1 to provide the striped filter is as taught in U.S. Pat. No. 3,771,857, except that in the present invention the stripes are non-overlapping and parallel to each other, not at an angle as described in the '857 patent. The fiducial mark 6 is on the surface of the substrate 1 where the pattern is provided, and the substrate 1 is opaque to visible and ultra-violet energy thereby negating the need for an antihalation coating to reduce second surface reflections as described in said U.S. Patent. It is important to note that the material or photoresist as taught in U.S. Pat. No. 3,771,857 must be greater in thickness than the coating which is to be patterned in the present invention: according to the prior art, preferably two times the thickness of the coating to be patterned but not so thick (typically less than the width of the stripe to be applied) as to reduce the uniformity of the coating across the width of the stripe by shadowing the coating vapor arriving at the substrate at incidence angles off normal.

After the first photoresist pattern is provided the short wavelength reflective coating 8 is deposited on the surface 2. The short wavelength reflective coating 8 is designed so that it has optical impedance matching layers closest to the substrate which match the index of refraction of the germanium or silicon substrate 1 which can have an index of refraction of approximately 4.0 for germanium or approximately 3.45 for silicon. On top of the reflective coating additional optical impedance matching layers are deposited such that the upper layers of coating will match into an index of approximately 1.00 which is the refractive index of the atmosphere or a vacuum such as space in which the filter is to be utilized. A suitable design for a short wavelength reflective coating 8 is set forth in TABLE 1 below.

It is also intended that other suitable dielectric materials can be used in the fabrication of the short wavelength reflective element. Absorbing materials such as dyes can also be used to act as a short wavelength reflective element, where permitted by the specific application.

TABLE 1

| LAYER NUMBER | LAYER MATERIAL | PHYSICAL THICKNESS (Micrometers) |
| --- | --- | --- |
| Substrate | Si | |
| 1 | SiO | 0.2553 |
| 2 | Ge | 0.1098 |
| 3 | SiO | 0.3620 |
| 4 | Ge | 0.1699 |
| 5 | SiO | 0.3037 |
| 6 | Ge | 0.1414 |
| 7 | SiO | 0.3622 |
| 8 | Ge | 0.1698 |
| 9 | SiO | 0.3572 |
| 10 | Ge | 0.1679 |
| 11 | SiO | 0.3572 |
| 12 | Ge | 0.1583 |
| 13 | SiO | 0.3630 |
| 14 | Ge | 0.1689 |
| 15 | SiO | 0.3814 |
| 16 | Ge | 0.1649 |
| 17 | SiO | 0.3481 |
| 18 | Ge | 0.1465 |
| 19 | SiO | 0.3491 |
| 20 | Ge | 0.1723 |
| 21 | SiO | 0.3457 |
| 22 | Ge | 0.0108 |
| 23 | SiO | 0.3077 |
| Air | | |

As can be seen from TABLE 1, the short wavelength reflective coating 8 is formed by alternating layers of low and high refractive index materials. This structure essentially forms a stop band (reflectance coating) at the shorter wavelengths of interest and forms a pass band (transmissive coating) at the longer wavelengths of interest. The low refractive index material can be suitable material such as silicon monoxide (SiO) having a refractive index of approximately 1.9 and supplied by Cerac. The high refractive index material can be a suitable material such as germanium (Ge) having a refractive index of approximately 4.0 and supplied by Eagle-Pitcher Industries. After the short wavelength reflector is coated, the photolithographic pattern is formed by dissolving the photoresist pattern and lifting off the coating that deposited on top of the resist pattern. One method for accomplishing the lift off of the coating deposited on top of the resist pattern is taught in U.S. Pat. No. 3,771,857, the relevant portions of which are hereby incorporated by reference.

After the lift off is accomplished for the short wavelength reflector, the process is repeated for the long wavelength reflector.

After the second photoresist pattern is provided the long wavelength reflective coating 9 is deposited on the surface 2. The long wavelength reflective coating 9 is designed so that it has optical impedance matching layers closest to the substrate which match the index of refraction of the germanium or silicon substrate 1. On top of the reflective coating additional optical impedance matching layers are deposited such that the upper layers of coating will match into an index of approximately 1.0. A suitable design for a long wavelength reflective coating 9 is set forth in TABLE 2 below.

Similarly, it is recognized that other suitable dielectric materials can be used in the fabrication of the long wavelength reflective element. Absorbing materials, such as dyes, can also be used to act as a long wavelength reflective element, where permitted by the specific application.

TABLE 2

| LAYER NUMBER | LAYER MATERIAL | PHYSICAL THICKNESS (Micrometers) |
| --- | --- | --- |
| Substrate | Si | |
| 1 | SiO | 0.0455 |
| 2 | Ge | 0.3259 |
| 3 | SiO | 0.5366 |
| 4 | Ge | 0.2590 |
| 5 | SiO | 0.4547 |
| 6 | Ge | 0.2390 |
| 7 | SiO | 0.5267 |
| 8 | Ge | 0.2115 |

TABLE 2-continued

| LAYER NUMBER | LAYER MATERIAL | PHYSICAL THICKNESS (Micrometers) |
| --- | --- | --- |
| 9 | SiO | 0.5235 |
| 10 | Ge | 0.2374 |
| 11 | SiO | 0.4895 |
| 12 | Ge | 0.2333 |
| 13 | SiO | 0.5207 |
| 14 | Ge | 0.2192 |
| 15 | SiO | 0.5109 |
| 16 | Ge | 0.2390 |
| 17 | SiO | 0.4869 |
| 18 | Ge | 0.2332 |
| 19 | SiO | 0.5573 |
| 20 | Ge | 0.2133 |
| 21 | SiO | 0.2985 |
| Air | | |

As can be seen from TABLE 2, the long wavelength reflective coating 9 is formed by alternating layers of low and high index materials. This structure essentially forms a stop band (reflectance coating) at the longer wavelengths of interest and forms a pass band (transmissive coating) at the shorter wavelengths of interest. The low refractive index material can be a suitable material such as silicon monoxide (SiO) having a refractive index of approximately 1.9 as supplied by Cerac. The high refractive index material can be a suitable material such as germanium (Ge). After the long wavelength reflector is coated the pattern is formed by dissolving the photoresist and lifting off the coating that deposited on top of the photoresist pattern. One method for accomplishing the lift off of the coating deposited on top of the resist pattern is taught in U.S. Pat. No. 3,771,857, the pertinent parts of which are herein incorporated by reference.

After the photolithographic patterned reflecting coatings 8 and 9 have been applied to surface 2, a multicolor continuous coating 7 is deposited on surface 3. The multicolor continuous coating 7 is designed such that its lower layers will match with the index of refraction of the germanium or silicon substrate 1. The other side of the multicolor continuous coating 7 is also designed to match into an index of refraction of approximately 1.0. Since this invention allows the spectral bandshaping and out of band blocking coatings to be continuous as opposed to patterned, as is the current practice, the thin film designer is no longer constrained by physical thickness in the design of this coating. A suitable design for a multicolor continuous coating 7 is set forth in TABLE 3 below.

TABLE 3

| LAYER NUMBER | LAYER MATERIAL | PHYSICAL THICKNESS (Micrometers) | LAYER NUMBER | LAYER MATERIAL | PHYSICAL THICKNESS (Micrometers) | LAYER NUMBER | LAYER MATERIAL | PHYSICAL THICKNESS (Micrometers) |
| --- | --- | --- | --- | --- | --- | --- | --- | --- |
| Substrate | Si | 0.1250 | 36 | Si | 0.2842 | 72 | Ge | 0.2571 |
| 1 | SiO | 0.4551 | 37 | SiO | 0.2326 | 73 | SiO | 0.4983 |
| 2 | Si | 0.0299 | 38 | Si | 0.1279 | 74 | Ge | 0.1072 |
| 3 | SiO | 0.2493 | 39 | SiO | 0.2845 | 75 | SiO | 0.6577 |
| 4 | Si | 0.3523 | 40 | Si | 0.3617 | 76 | Ge | 0.4501 |
| 5 | SiO | 0.4995 | 41 | SiO | 0.8206 | 77 | SiO | 0.5795 |
| 6 | Si | 0.1366 | 42 | Ge | 0.2100 | 78 | Ge | 0.2064 |
| 7 | SiO | 0.1859 | 43 | SiO | 0.5815 | 79 | SiO | 0.6985 |
| 8 | Si | 0.1381 | 44 | Ge | 0.4434 | 80 | Ge | 0.0943 |
| 9 | SiO | 0.5373 | 45 | SiO | 0.6814 | 81 | SiO | 0.1487 |
| 10 | Si | 0.2899 | 46 | Ge | 0.1009 | 82 | Ge | 0.1221 |
| 11 | SiO | 0.2948 | 47 | SiO | 0.5213 | 83 | SiO | 0.2494 |
| 12 | Si | 0.1781 | 48 | Ge | 0.2694 | 84 | Ge | 0.0704 |
| 13 | SiO | 0.3130 | 49 | SiO | 0.4035 | 85 | SiO | 0.1896 |
| 14 | Si | 0.0945 | 50 | Ge | 0.2744 | 86 | Ge | 0.1251 |

TABLE 3-continued

| LAYER NUMBER | LAYER MATERIAL | PHYSICAL THICKNESS (Micrometers) | LAYER NUMBER | LAYER MATERIAL | PHYSICAL THICKNESS (Micrometers) | LAYER NUMBER | LAYER MATERIAL | PHYSICAL THICKNESS (Micrometers) |
|---|---|---|---|---|---|---|---|---|
| 15 | SiO | 0.4883 | 51 | SiO | 0.5736 | 87 | SiO | 0.1251 |
| 16 | Si | 0.3273 | 52 | Ge | 0.8891 | 88 | Ge | 0.0934 |
| 17 | SiO | 0.2243 | 53 | SiO | 0.5740 | 89 | SiO | 0.1892 |
| 18 | Si | 0.1795 | 54 | Ge | 0.2604 | 90 | Ge | 0.0890 |
| 19 | SiO | 0.3359 | 55 | SiO | 0.5411 | 91 | SiO | 0.2325 |
| 20 | Si | 0.0872 | 56 | Ge | 0.2375 | 92 | Ge | 0.1199 |
| 21 | SiO | 0.3427 | 57 | SiO | 0.6069 | 93 | SiO | 0.2353 |
| 22 | Si | 0.6519 | 58 | Ge | 0.1144 | 94 | Ge | 0.0852 |
| 23 | SiO | 0.4295 | 59 | SiO | 0.6833 | 95 | SiO | 0.1815 |
| 24 | Si | 0.1200 | 60 | Ge | 1.3670 | 96 | Ge | 0.1051 |
| 25 | SiO | 0.2553 | 61 | SiO | 0.6436 | 97 | SiO | 0.1051 |
| 26 | Si | 0.2427 | 62 | Ge | 0.1469 | 98 | Ge | 0.1162 |
| 27 | SiO | 0.2567 | 63 | SiO | 0.6059 | 99 | SiO | 0.1915 |
| 28 | Si | 0.3239 | 64 | Ge | 0.1559 | 100 | Ge | 0.0724 |
| 29 | SiO | 0.2743 | 65 | SiO | 0.5951 | 101 | SiO | 0.2488 |
| 30 | Si | 0.2416 | 66 | Ge | 0.1722 | 102 | Ge | 0.1221 |
| 31 | SiO | 0.2556 | 67 | SiO | 0.6300 | 103 | SiO | 0.1570 |
| 32 | Si | 0.1759 | 68 | Ge | 0.9052 | 104 | Ge | 0.0876 |
| 33 | SiO | 0.2086 | 69 | SiO | 0.5866 | 105 | SiO | 0.4439 |
| 34 | Si | 0.3164 | 70 | Ge | 0.2332 |  | AIR |  |
| 35 | SiO | 0.3612 | 71 | SiO | 0.3690 |  |  |  |

Figure 4:
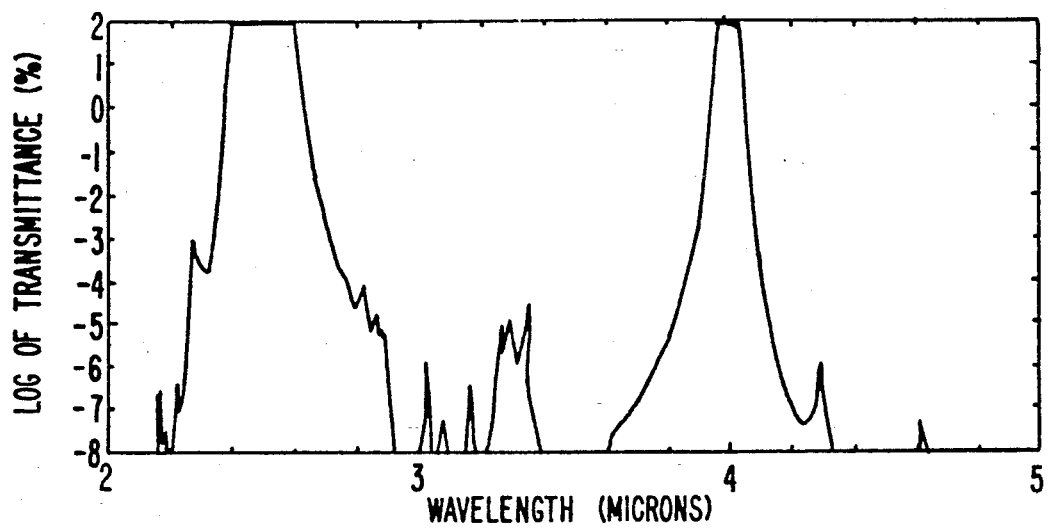
FIG. 4 is a plot showing the spectral performance on a log of transmittance scale of a typical multiband transmitting coating.

The performance characteristics for a particularly preferred multicolor continuous coating 7 is shown in FIG. 4. The multicolor continuous coating 7 is preferably formed by alternating layers of germanium (Ge) supplied by Eagle-Picher Industries, silicon monoxide (SiO) supplied by Cerac for the long wavelength band, silicon (Si) supplied by Silicon Castings, and silicon monoxide for the short wavelength band. Since the multicolor continuous coating 7 is the most difficult and costly of the coatings to provide, the application of this coating 7 on top of the patterned reflectors 8 and 9 on surface 2 results in a higher overall yield and, therefore, a lower overall cost. The multicolor continuous coating 7 may be designed as one continuous coating as described above and shown in FIG. 2 or as discrete modules as shown in FIG. 3 where short wavelength band transmitting module 11, medium/long wavelength band transmitting module 12, and a common blocking coating 13 are provided to obtain out of band reflection and/or absorption over the particular wavelength range specified.

Figure 5:
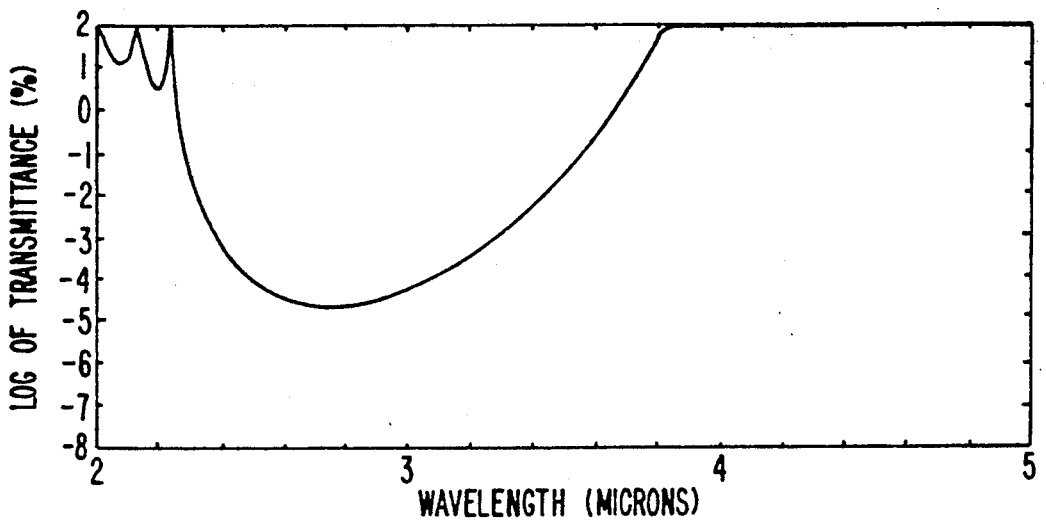
FIG. 5 is a plot showing the spectral performance on a log of transmittance scale of a patterned reflecting filter that transmits the longer wavelength band while reflecting and/or absorbing the shorter wavelength band.

The typical performance characteristics for a short wavelength reflective coating 8 is shown in FIG. 5. Long wavelength reflective coating 9 is characterized by a performance plot such as that shown in FIG. 6. These characteristics are merely illustrative of the instant invention, and are not intended to limit the scope of the appended claims.

Figure 7:
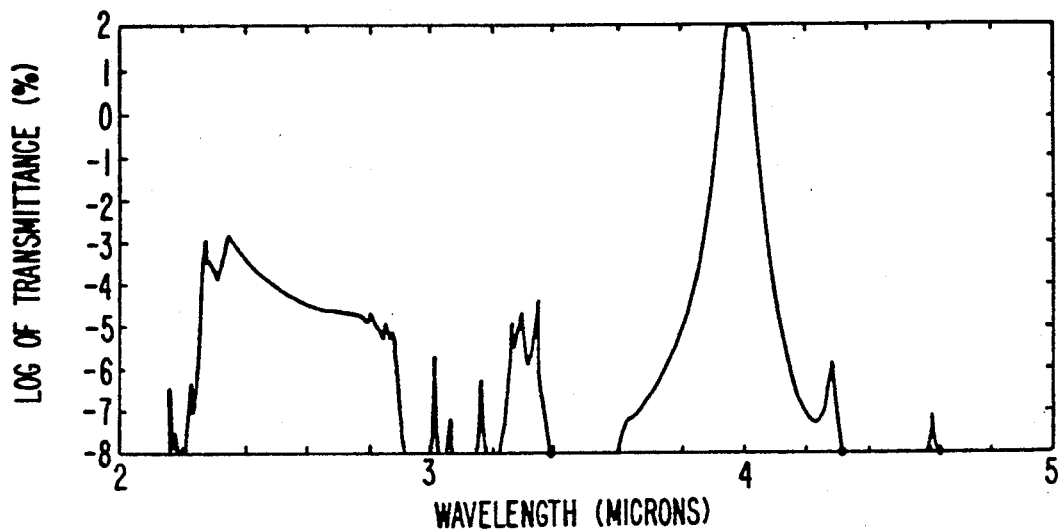
FIGS. 7 and 8 are plots showing the spectral performance on a log of transmittance scale which can be obtained from having the multicolor continuous filter in combination with one or the other of the patterned reflecting filters.
Figure 8:
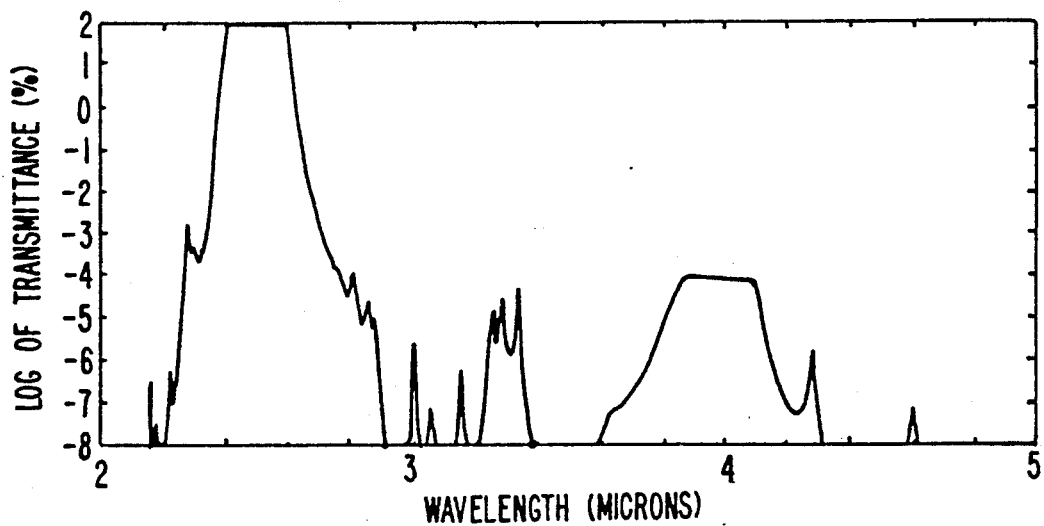

When the multicolor continuous coating 7, or a composite of discrete modules as shown in FIG. 3, is combined with a photolithographic patterned coating such as elements 8 and 9, the observed response can be demonstrated by the log transmittance plots shown in FIGS. 7 and 8. These figures show that the combination of a multicolor continuous coating with a specific patterned reflecting filter can be used to obtain specific wavelength band responses in specifically desired wavelength ranges. FIG. 7 illustrates a desired response in the long wavelength range, corresponding to radiant energy which has passed through the patterned short wavelength reflecting filter 8 which transmits the long wavelength radiant energy. FIG. 8 illustrates the desired response for the short wavelength range, corresponding to radiant energy which has passed through the patterned reflective filter 9 which transmits the short wavelength radiant energy.

Figure 6:
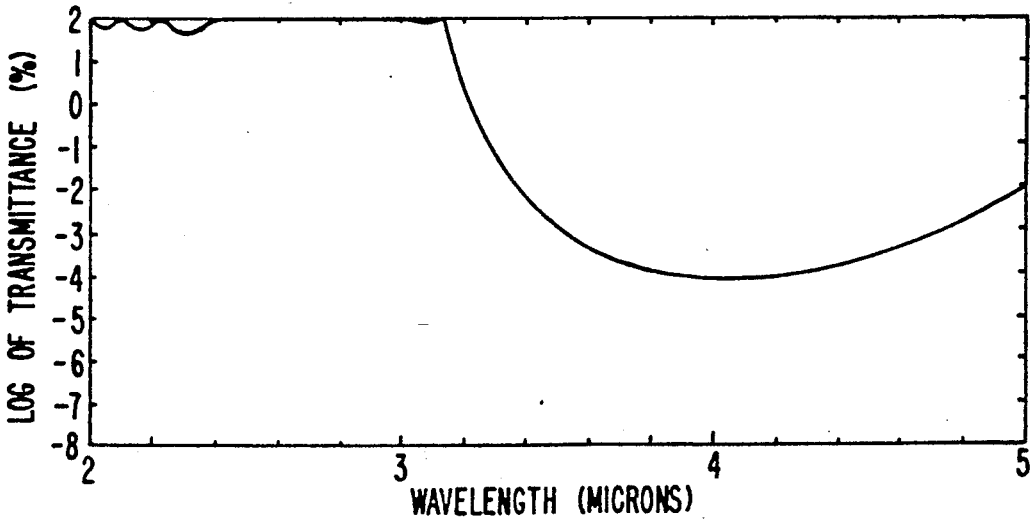
FIG. 6 is a plot showing the spectral performance on a log of transmittance scale of a patterned reflecting filter that transmits the shorter wavelength band while reflecting and/or absorbing the longer wavelength band.
Figure 9:
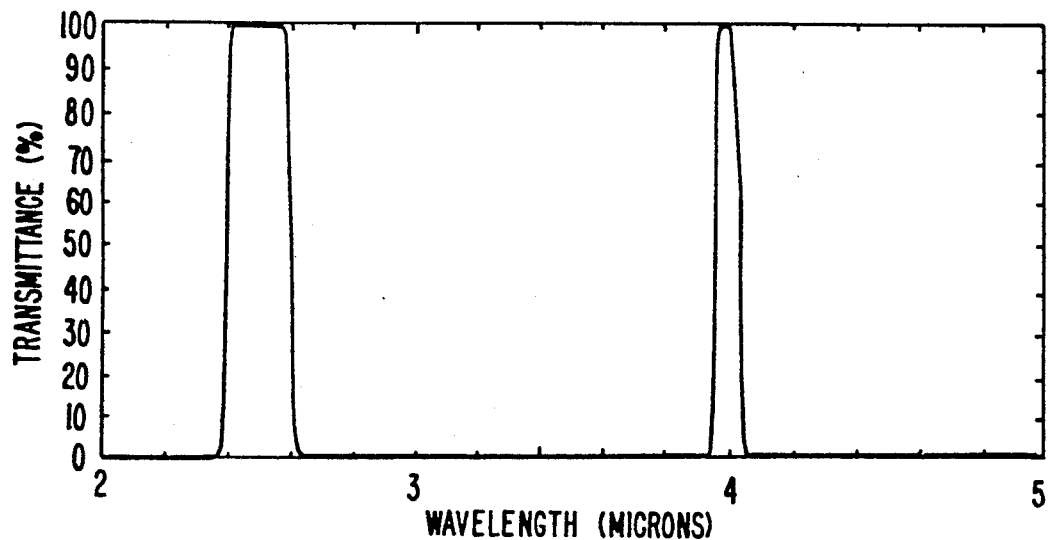
FIG. 9 is a plot showing the spectral performance on a zero to one hundred percent transmittance scale of a typical multiband transmitting coating.
Figure 10:
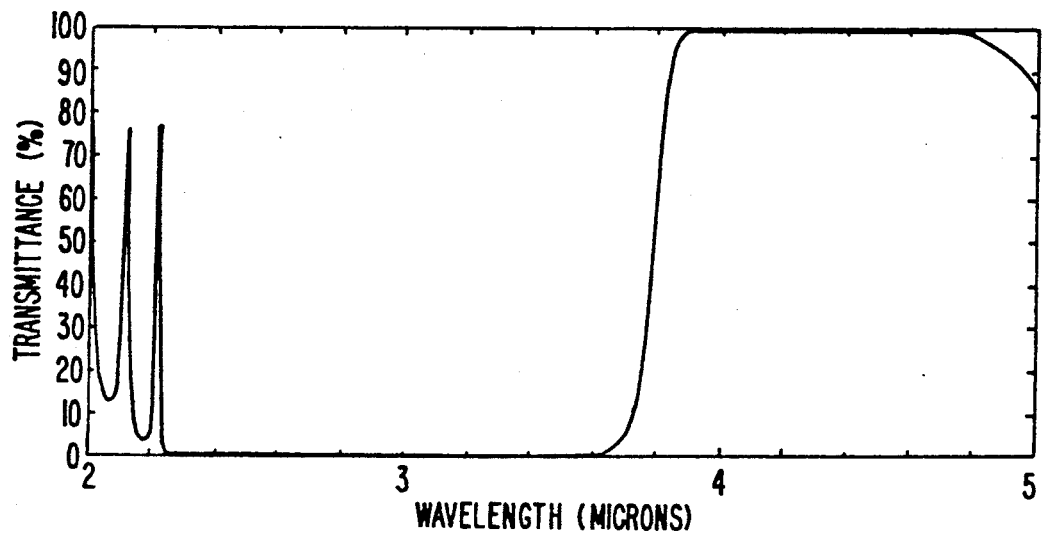
FIG. 10 is a plot showing the spectral performance on a zero to one hundred percent transmittance scale of a patterned reflecting filter that transmits the longer wavelength band while reflecting and/or absorbing the shorter wavelength band.
Figure 11:
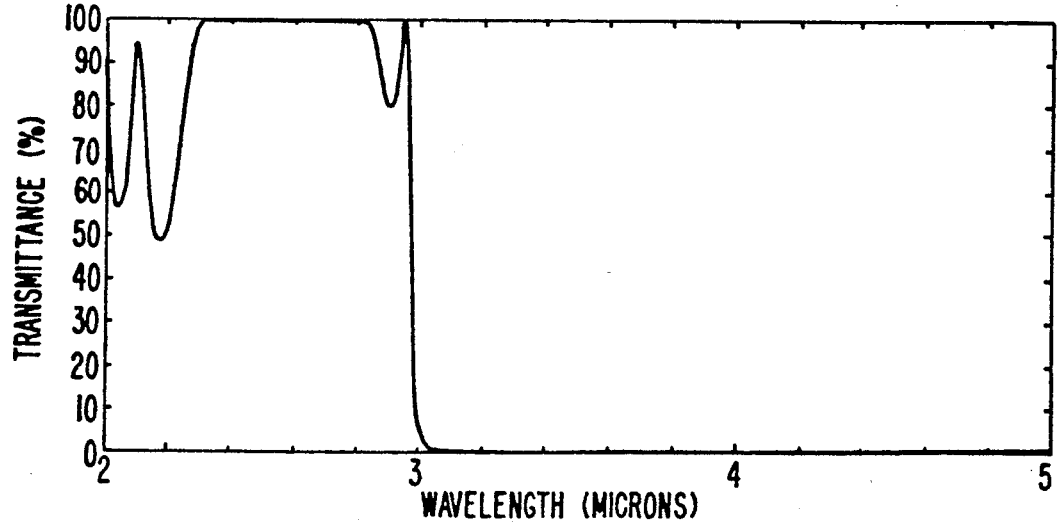
FIG. 11 is a plot showing the spectral performance on a zero to one hundred percent transmittance scale of a patterned reflecting filter that transmits the shorter wavelength band while reflecting and/or absorbing the longer wavelength band.
Figure 12:
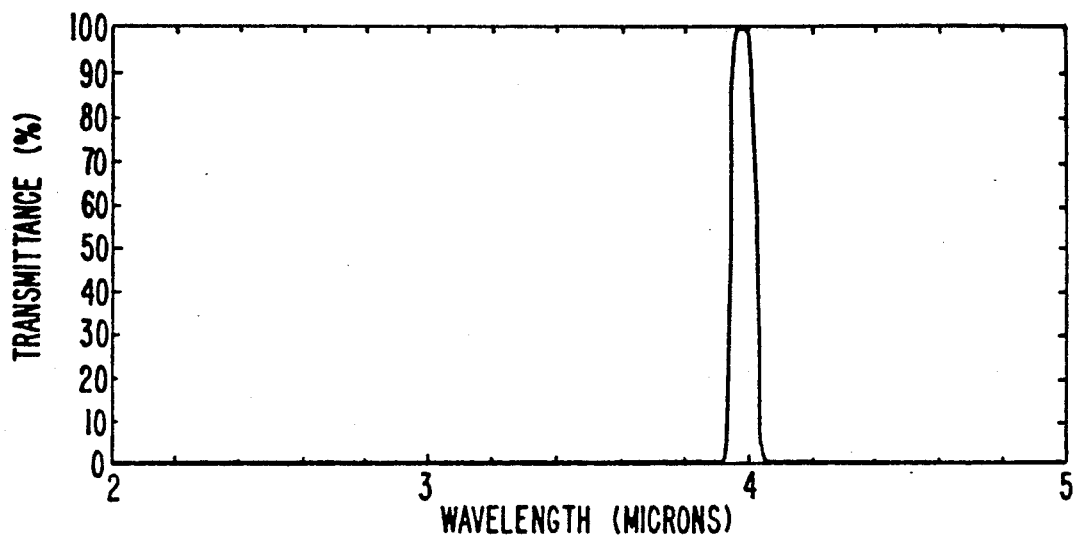
FIGS. 12 and 13 are plots showing the spectral performance on a zero to one hundred percent transmittance scale which is obtained when the multicolor continuous filter is provided in combination with one or the other of the patterned reflecting filters.
Figure 13:
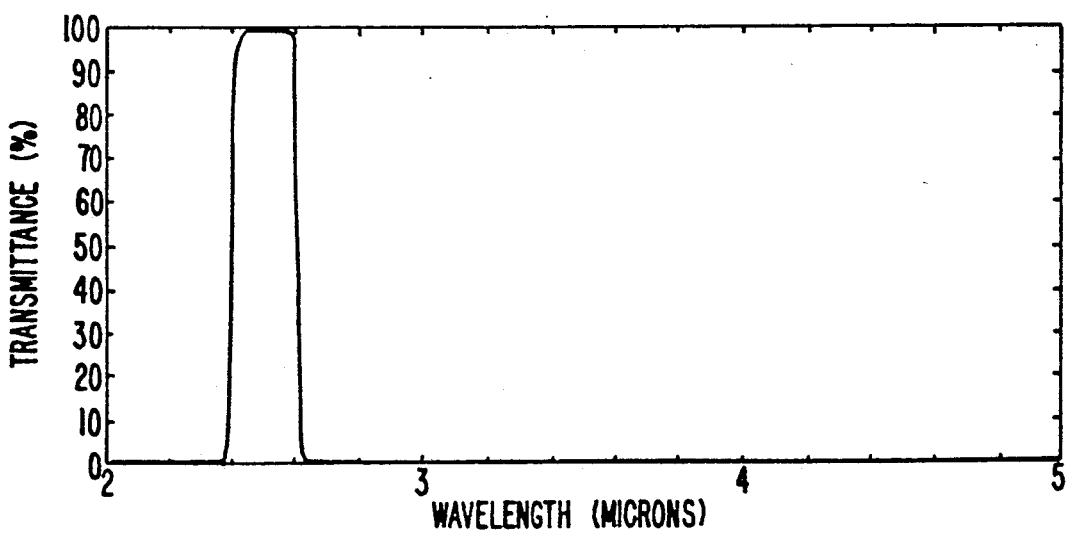

In FIG. 9, the spectral performance of a typical multiband transmitting coating is shown as percent transmittance. This plot demonstrates transmittance in the 2.5 micron and 4.0 micron ranges. FIG. 10 is related to FIG. 5, both of them plotting the performance of a short wavelength reflective coating such as coating 8 in FIGS. 2 and 3. FIG. 11 is a translation of FIG. 6, illustrating the percent transmittance of a long wavelength reflective coating, such as coating 9 in FIGS. 2 and 3. FIG. 12 is the percentage transmittance plot for a desired response in the long wavelength range, obtained by using a multicolor continuous filter 7, or modules 11, 12 and 13, in combination with a short wavelength reflective coating 8. FIG. 13 is the corresponding percentage transmittance plot for the long wavelength reflective coating 9.

Figure 14:
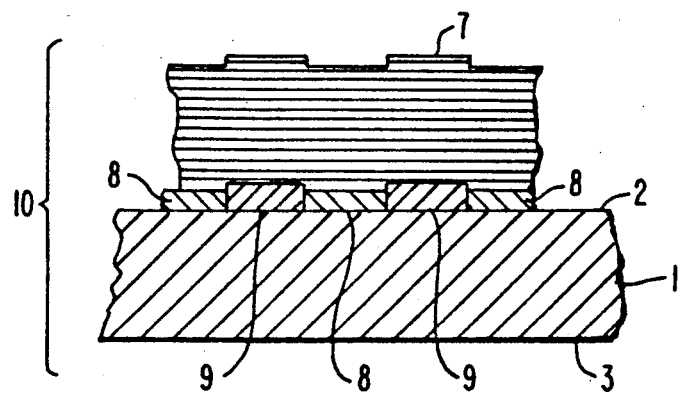
FIG. 14 is a sectioned edge view of a multicolor, thin film wavelength discriminating optical filter in which the continuous multi-spectral coating is deposited directly on top of the patterned reflecting coatings.

While FIGS. 2 and 3 represent an embodiment of the present invention in which the multicolor continuous coating 7 and the reflective coatings 8 and 9 are found on opposite surfaces of the substrate, FIG. 14 illustrates an embodiment in which these coatings are found on the same surface of the substrate 1. In FIG. 14, multicolor thin film wavelength discriminating optical filter 10 comprises a substrate 1 upon which have been deposited short wavelength reflective coating 8 and long wavelength reflective coating 9. These two reflective coatings are applied alternately and adjacently to the substrate. In this embodiment, the multicolor continuous coating 7 is applied directly on top of the reflective coatings 8 and 9. Since these various coatings consist of multiple layers of dielectric materials having differing indices of refraction, the coatings can be designed to possess matching indices of refraction for the adjacent layers.

It will be recognized by those of ordinary skill in the art that there are other cost effective means of providing suitable transmission of the particular band of interest while blocking all others. Of course, these alternatives are acceptable only if they meet the requirements of the specific application. In many applications which do not require the stability, durability or life of multilayer coatings, patterned filters can be made from suitable dyes, dyed gelatins and a combination of metals and dielectrics. The patterning of dye filters can be accomplished inexpensively by printing or cutting and mounting strips of dyed material on a suitable substrate. While these alternatives would not be suitable for focal plane filters for outer space applications, they could be very effective for color television camera applications.

Figure 15:
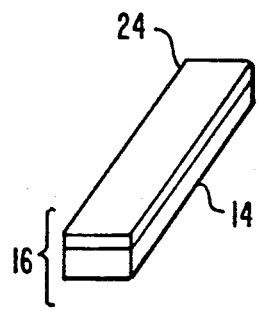
FIGS. 15 is a simplified schematic perspective view of a long wavelength reflecting coating applied directly on top of a short wavelength detector array.
Figure 16:
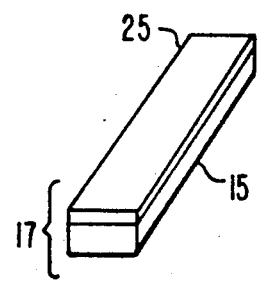
FIG. 16 is a simplified schematic perspective view of a short wavelength reflecting coating applied directly on top of a long wavelength detector array.
Figure 17:
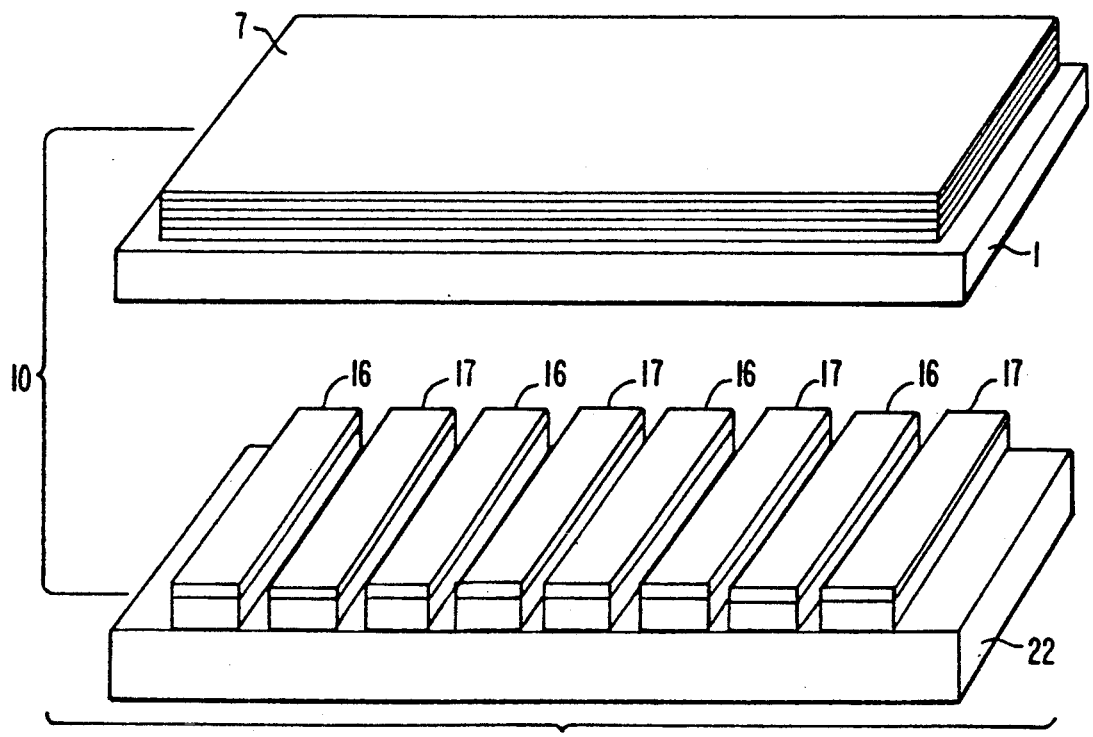
FIG. 17 is a simplified schematic perspective view of a multi-spectral filter on an appropriate substrate in series with a detector array consisting of a substrate that supports alternating short and long wavelength detector arrays with integral short and long wavelength reflecting coatings.

Another embodiment of the present invention utilizes detectors or detector arrays in combination with a multicolor coating. Such an embodiment is shown in FIGS. 15, 16 and 17. In FIG. 15, a short wavelength detector array 14 has been coated with a discrete long wavelength reflecting coating 24. In FIG. 16, a long wavelength detector array 15 has been coated with a discrete short wavelength reflecting coating 25.

Referring now to FIG. 17, a multicolor thin film wavelength discriminating optical filter 10 is obtained by combining a multicolor coating 7 applied to substrate 1, with detector array substrate 22 to which short wavelength detector array with long wavelength reflecting filter on top of detector array 16 and long wavelength detector array with short wavelength reflecting filter on top of detector array 17 have been applied.

While the embodiment of FIG. 17 has been described with reference to the multicolor coating being applied to only one surface of the substrate 1, it is possible that a multicolor coating may be applied to both surfaces of the substrate 1 to achieve substantially the same result.

Suitable detectors are available from such manufacturers as Santa Barbara Research Center, Honeywell, Judson, Rockwell International and Aerojet. The detector types which are generally used in this type of application are HgCdTe (Mercury, Cadmium, Telluride), InSb (IndiumAntimonide), Si (Silicon), PbS (Lead Sulfide), PbSe (Lead Selenide), GaAs (Gallium arsenide), and GaAsP (Gallium Arsenide Phoshide). "The Infrared Handbook," prepared by The Infrared Information and Analysis (IRIA) Center, Environmental Research Institutue of Michigan, for the Office of Naval Research, (Library of Congress Catalog Card No. 77-90786) Editors: George J. Zissis and William L. Wolfe, pp. 11-87, describes the spectral detectivities of the more common detectors under specific conditions of detector temperature, background temperature and field of view.

The surface of a detector substrate, or the detector itself, is typically an optical quality surface (e.g., an 80/50 optical surface as described in military specification MIL-F-48616 and MIL-C-48497) suitable for the deposition of an optical coating. The technique which one would use to deposit the switch type coatings onto the surface of a detector substrate would vary, depending upon the stage of the manufacturing process in which the coatings are to be applied. Chemical vapor deposition or sputtering could be used early in the manufacturing process, prior to the P-N junction being grown. Evaporation is a technique which can be applied after the detector is finished.

The physical dimensions of the detector surfaces vary, but typically are less than 1 millimeter by 1 millimeter.

Since most of the detectors used are sensitive over a broad band of electromagnetic radiation, one detector type could be, and typically is used in a focal plane to detect more than one band of radiant energy. If different detectors are used they are typically a combination of HgCdTe and InSb detectors or PbS and InSb detectors.

Figure 18:
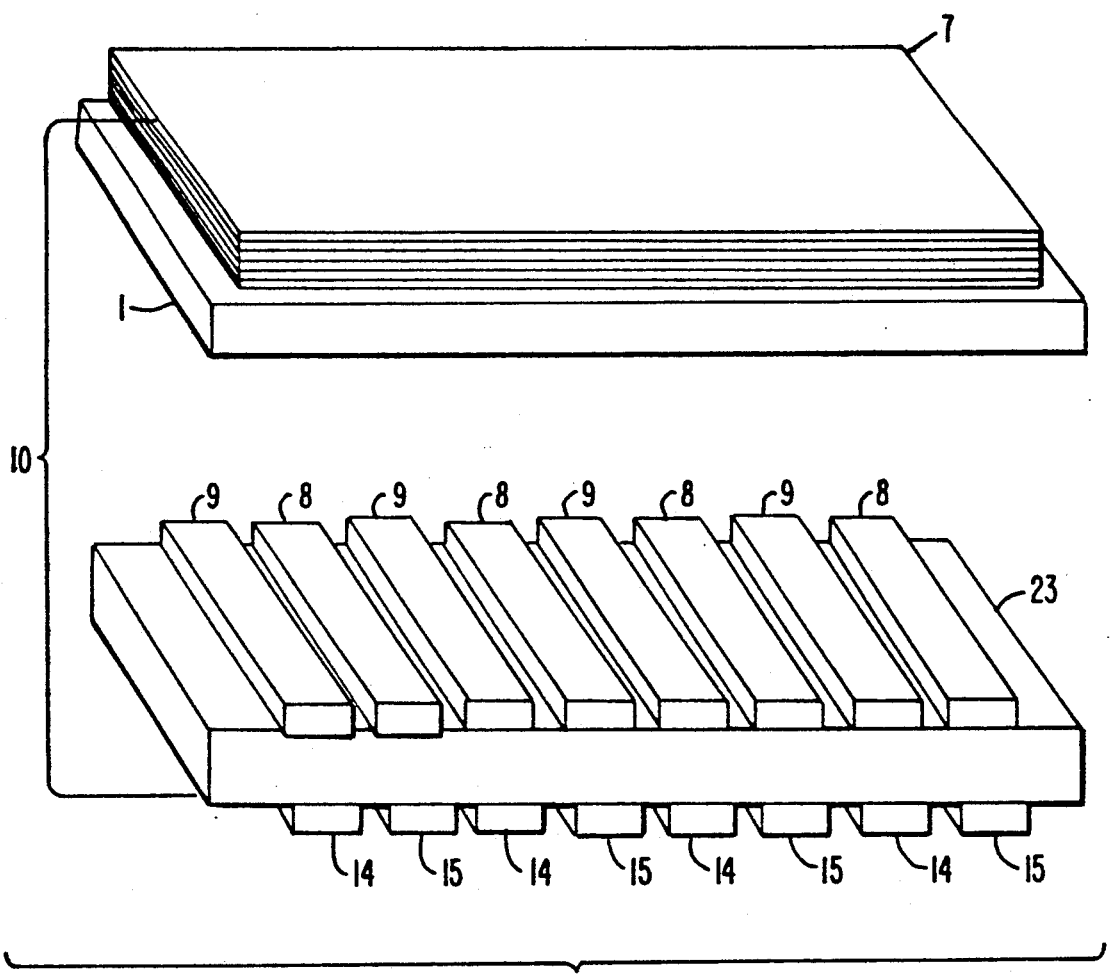
FIG. 18 is a simplified schematic perspective view of a multi-spectral filter on an appropriate transparent substrate in series with a detector array consisting of a substrate that supports alternating patterned short and long wavelength reflecting coatings on the top surface and alternating long and short wavelength detector arrays directly opposite and aligned with the patterned coatings on the opposite surface.

FIG. 18 illustrates an alternate embodiment in which the filter 10 comprises the combination of a multicolor coating 7 applied to substrate 1 with a transparent substrate 23 upon which have been deposited short wavelength reflective coating 8 and long wavelength reflective coating 9, and short wavelength detector array 14 and long wavelength detector array 15. In this embodiment, substrate 23 must be transparent to the radiant energy transmitted by both reflective coatings 8 and 9. Transparent materials useful in the present invention must be selected so that they are transparent over the spectral detectivity range of the detectors and must simultaneously be capable of withstanding the harsh chemical and physical environments of the detector manufacturing process. One preferred transparent substrate 23 is sapphire (available from INSACO, Quakertown, Pa.). Sapphire is preferred because of its superior mechanical and optical properties. Other suitable materials include barium fluoride, zirconia and quartz.

Substrate thickness is typically chosen for mechanical stability. Thicknesses of between 0.005 and 0.010 inches are typical for sapphire substrates.

Figure 19:
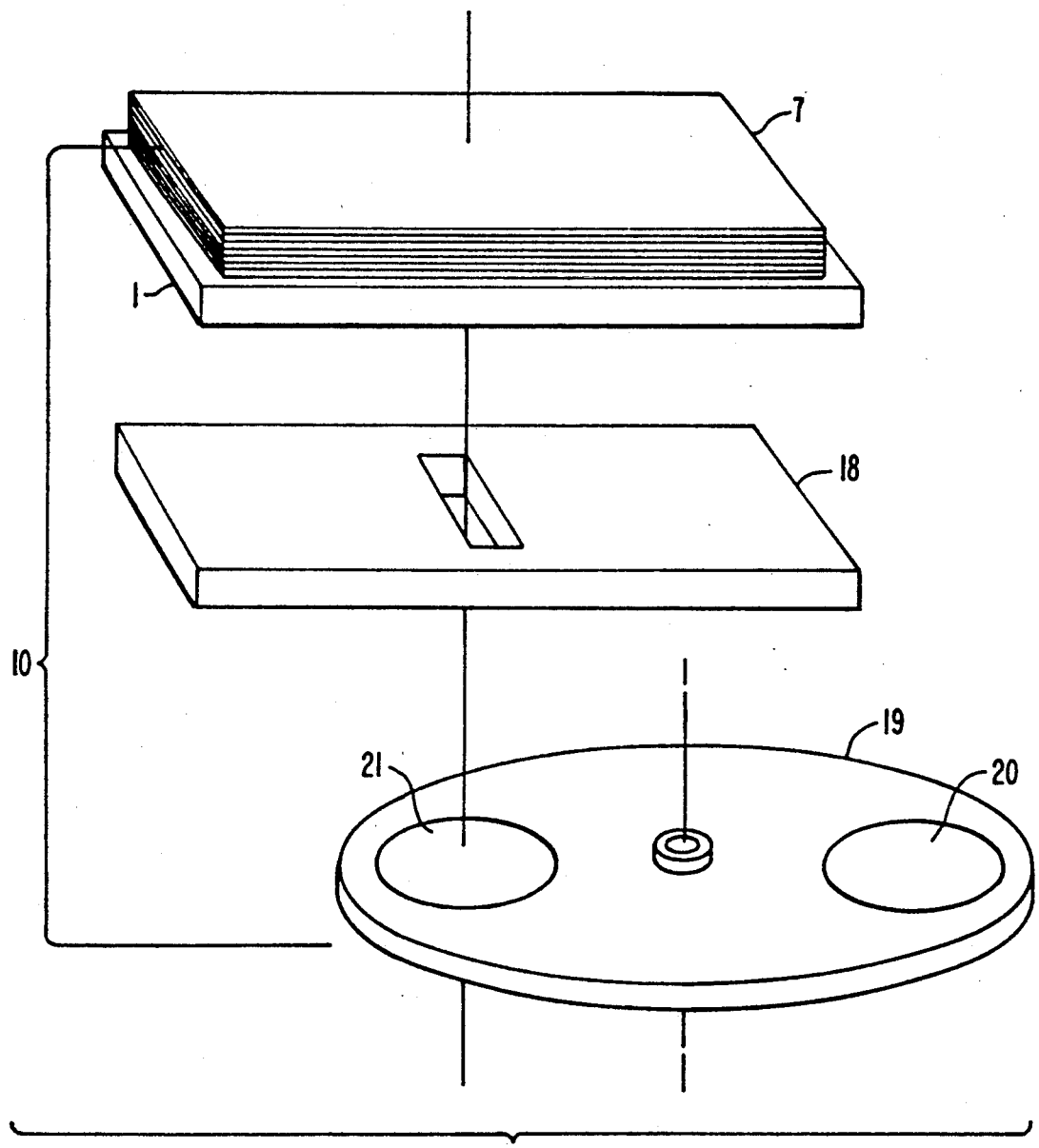
FIG. 19 is a simplified schematic perspective view of a multi-spectral filter on an appropriate transparent substrate in series with an aperture mask and a filter wheel with discrete short and long wavelength reflecting coatings on appropriate substrates.

In FIG. 19, another embodiment of the instant invention is shown in which a multicolor coated substrate 1 is combined with aperture mask 18 and with filter wheel 19 to obtain the filter 10. The filter wheel 19 contains a short wavelength reflecting filter 20 and long wavelength reflecting filter 21. As shown in FIG. 19, the path of radiant energy is generally perpendicular to the horizontal planes of the three elements: substrate 1, aperture mask 18 and filter wheel 19. The filter wheel 19 can be rotated about its center to alternate between short wavelength reflecting filter 20 and long wavelength reflecting filter 21. Aperture mask 18 contains a slot or opening through which the radiant energy is permitted to pass. In all other locations, the opaque aperture mask 18 blocks the transmission of all wavelength bands.

This filter wheel approach can be used where two or more distinct and different bands of radiant energy are to be detected by a single detector. The conventional approach would require individual filters in the filter wheel that passed a particular band of interest while rejecting and/or absorbing all energy outside of that band that is detectable by that particular detector. According to the present invention, this would be greatly simplified by requiring that only switch type coatings be installed in the filter wheel to pass one band transmitted by the multiband filter while rejecting all others.

The aperture slot 18 shown in FIG. 19 would be of a suitable size (on the order of 1 millimeter for a typical silicon detector) to trim the beam of radiant energy from the multiband filter such that the signal reaching a detector behind the switch coating would always fall on an area of the surface of the detector that was repeatable and linear in response.

This filter wheel embodiment is beneficial in any application requiring differentiation between narrow bands of radiant energy. Some examples of utility would be instruments that measure the purity of water by using spectral techniques to detect and measure contaminant levels; blood analysis instruments that use spectral techniques to determine the level of certain elements in blood; and monochrometers.

Figure 20:
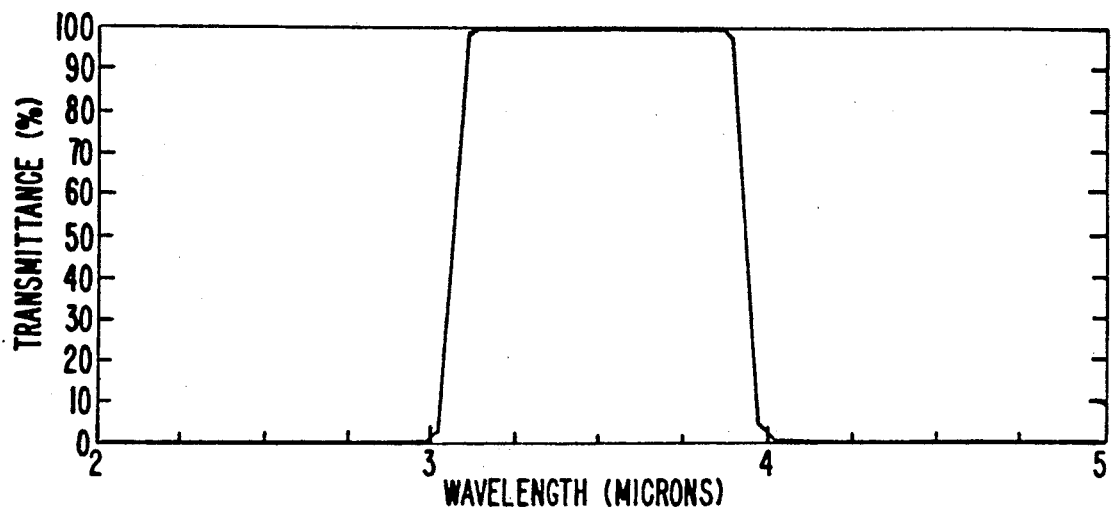
FIG. 20 is a plot showing the spectral performance on a zero to one hundred percent transmittance scale of a multiband transmitting coating.

In another embodiment of the present invention, which can take on the physical configuration of any of FIGS. 2, 3, 14, 17, 18 and 19, the multicolor coating can be selected as a wide band transmitting coating having a short wavelength edge and a long wavelength edge. The percentage transmittance characteristics of such a wide band coating are shown in FIG. 20. These wavelength band edges are selected to represent one edge of two distinct and different colors.

Figure 21:
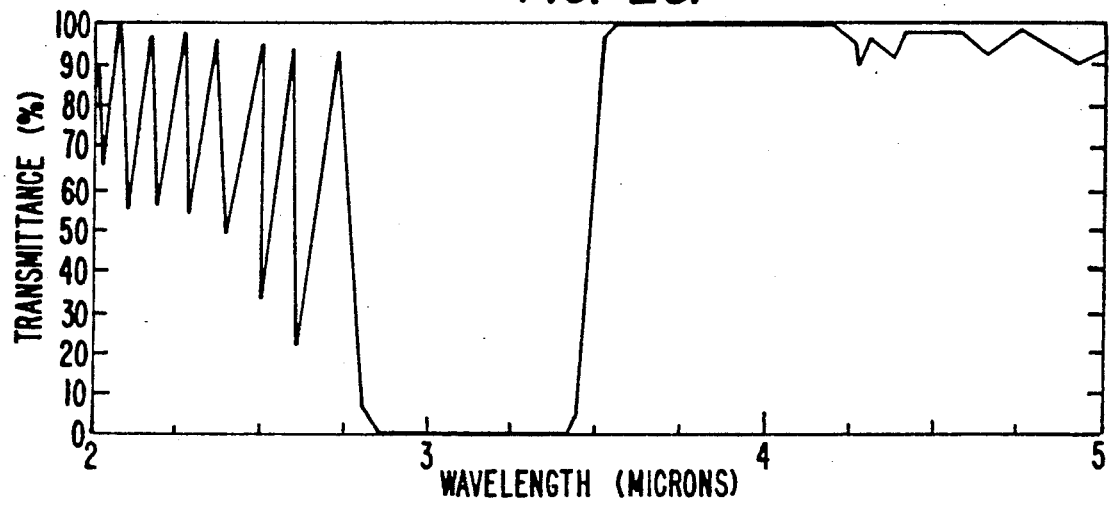
FIG. 21 is a plot showing the spectral performance on a zero to one hundred percent transmittance scale of a patterned reflecting filter that transmits and shapes the short wavelength side of the long wavelength band while reflecting and/or absorbing the shorter wavelength band.

A short wavelength reflective coating 8 is provided which has the performance characteristics shown in FIG. 21. This coating is selected to complement the long wavelength edge of the wide band coating by providing the second transmission edge for one of the two colors spanned by the wide band transmitting coating.

Figure 22:
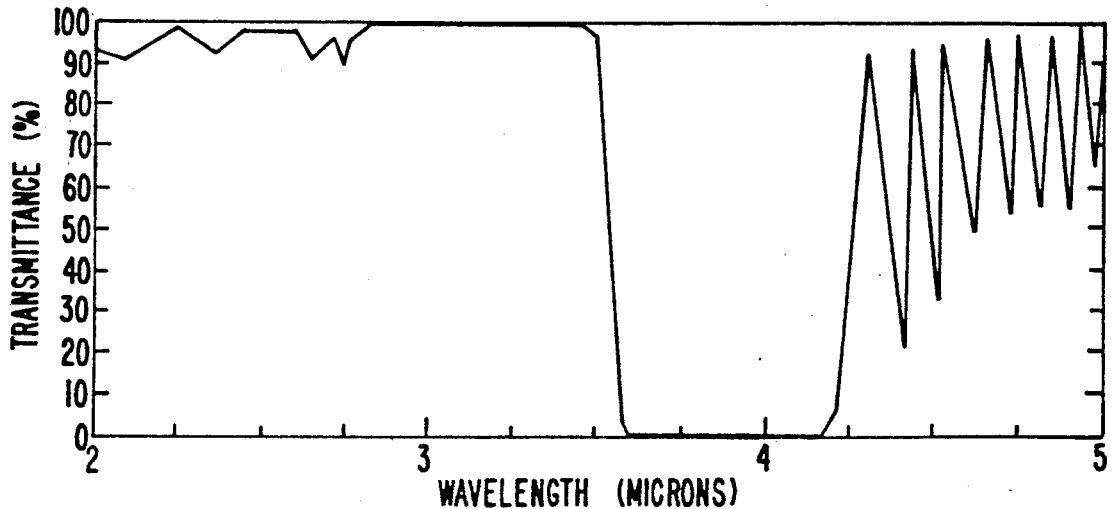
FIG. 22 is a plot showing the spectral performance on a zero to one hundred percent transmittance scale of a patterned reflecting filter that transmits and shapes the long wavelength side of the short wavelength band while reflecting and/or absorbing the longer wavelength band.

A long wavelength reflective coating 9 is also provided which has the performance characteristics as shown in FIG. 22. This coating provides the second transmission edge for the second color spanned by the wide band transmitting coating.

Figure 23:
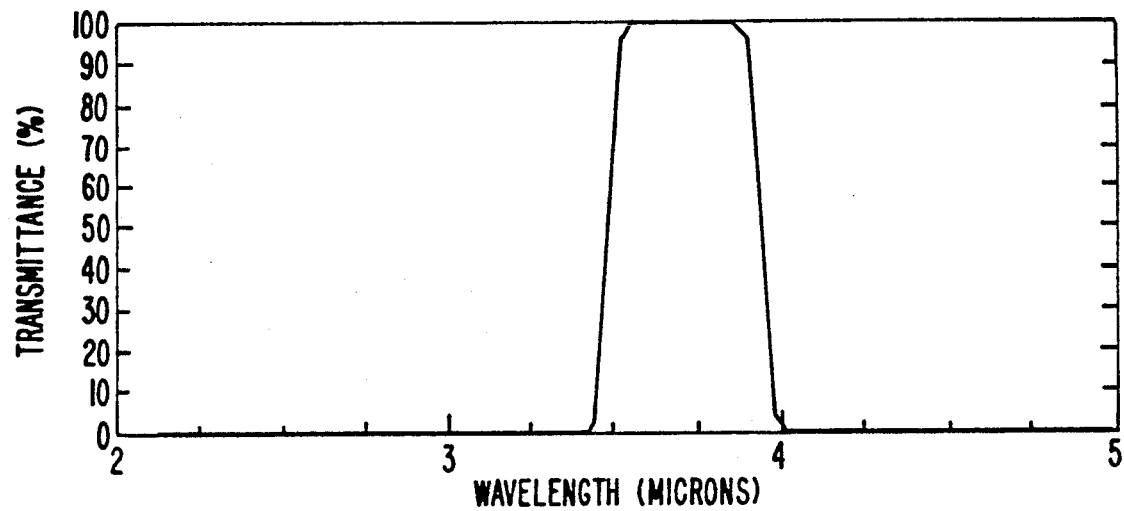
FIGS. 23 and 24 are plots showing the spectral performance on a zero to one hundred percent transmittance scale which is obtained from having the multicolor continuous filter in combination with one or the other of the patterned shaping/reflecting filters.

The response resulting from the radiant energy which passes through a wide band transmitting coating (as characterized by FIG. 20) and through a short wavelength reflective coating, having the characteristics set forth in FIG. 21 is shown in FIG. 23. This long wavelength response represents a single color response.

Figure 24:
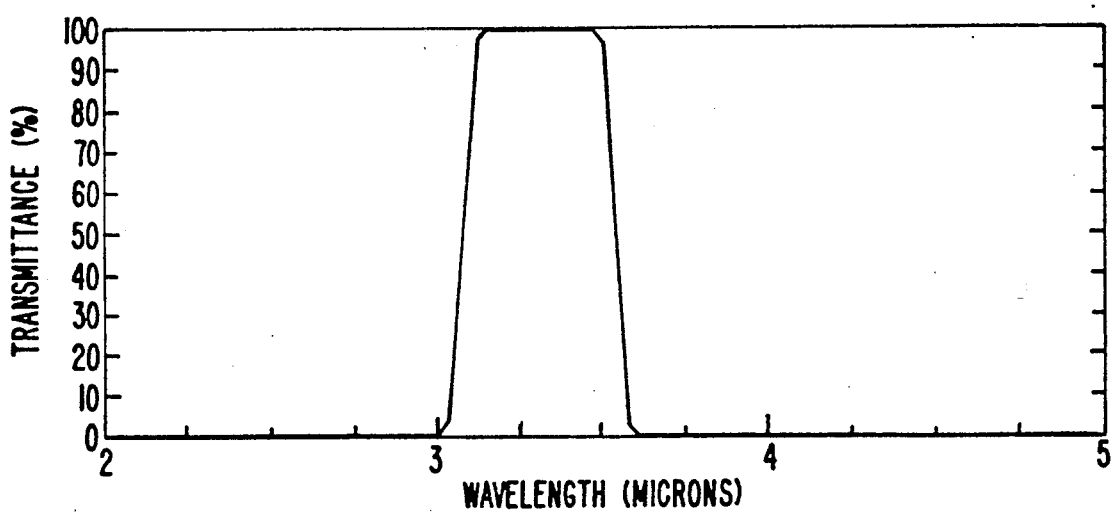

The response resulting from the radiant energy which passes through a wide band transmitting coating (as characterized by FIG. 20) and through a long wavelength reflective coating, having the characteristics set forth in FIG. 22 is shown in FIG. 24. This short wavelength response represents a single color response, different from the color response illustrated by FIG. 23.

The invention disclosed herein is applicable to all of the devices mentioned above. The present approach permits simplification of the multiband coating at the expense of complicating the "switch" coating where appropriate. For example, the filter described in FIGS. 23 and 24 could be manufactured using the techniques described in FIGS. 4, 5 and 6, as well as any techniques described in FIGS. 20, 21 and 22.

While the invention has been described with references to certain preferred embodiments, it is understood that these embodiments are examples and are not intended to limit the scope of the claims appended hereto. As will be apparent to those skilled in the art, many modifications and variations of this invention may be made without departing from its spirit and scope.

We claim:

1. A combination of:
   a. an optical thin film filter useful in the spatial and spectral separation of two or more transmitting bands of radiant energy which comprises:
      (1) a substrate having at least one surface for receiving coatings and which is substantially transparent to said radiant energy at the wavelength bands of interest;
      (2) a first coating on said substrate capable of transmitting two or more wavelength bands of interest and reflecting and/or absorbing all other out of band wavelengths; and,
   b. at least two detectors or detector arrays, which are adjacently positioned in a path of filtered radiant energy which has passed through said first coating and said substrate, said detectors or detector arrays capable of detecting at least one wavelength band different from the wavelength band detected by the other detector or detector array, and each of said detectors or detector arrays provided with a coating, which coating is capable of both transmitting at least one wavelength band transmitted by said first substrate coating and transmitting at least one band that its respective detector or detector array is capable of detecting, said detector or detector array coating reflecting all other wavelength bands, wherein said detector or detector array coating is formed of a plurality of high and low index of refraction dielectric materials, arranged in multiple layers.

2. The combination of claim 1 wherein said detector or detector array coatings are characterized by additional optical impedance matching layers which will match the index of refraction of the upper layers of said coatings, to the index of refraction of the atmosphere in which detector or detector array is to be used.

3. A combination of:
   a. an optical thin film filter useful in the spatial and spectral separation of two or more transmitting bands of radiant energy which comprises:
      (1) a substrate having at least one surface for receiving coatings and which is substantially transparent to said radiant energy at the wavelength bands of interest;
      (2) a first dielectric coating on one surface of said substrate, said first coating capable of transmitting two or more wavelength bands of interest and reflecting and/or absorbing all other out of band wavelengths; and,
   b. at least one filter wheel which is positioned in a path of filtered radiant energy which has passed through said first coating and said substrate, said filter wheel provided with at least two discrete dielectric filters, each of which is capable of reflecting all but one wavelength band of radiant energy transmitted by said first dielectric coating and each of said discrete filters is capable of transmitting wavelength bands different than the bands of radiant energy transmitted by the other discrete filters on the filter wheel.

4. The combination of claim 3 further comprising an aperture mask which is positioned between said optical thin film filter and said filter wheel, said aperture mask passing radiant energy through its aperture and blocking the path of all other radiant energy except through the aperture.

5. A combination of
   a. an optical thin film filter useful in the spatial and spectral separation of two or more transmitting bands of radiant energy which comprises:
      (1) a substrate having at least one surface for receiving coatings and which is substantially transparent to said radiant energy at the wavelength bands of interest;
      (2) a first coating on said substrate capable of transmitting at least two wavelength bands of interest and reflecting and/or absorbing all other out of band wavelengths, said first coating acting as a wide band transmitting coating with the short wavelength and long wavelength edges of the transmission band being one edge of two distinct and different colors; and,
   b. at least two detectors or detector arrays which are adjacently positioned in the path of filtered radiant energy which has passed through said first coating and said substrate, said detectors or detector arrays provided with photolithographic patterned coatings, which coatings are capable of reflecting all but one band of radiant energy transmitted by said optical thin film filter, and each of said detectors or detector arrays provided with photolithographic coatings which transmit different wavelength bands than the wavelength bands transmitted by the other photolithographic coatings, each of said photolithographic coatings providing the second transmission edge for one color, wherein said detector or detector array photolithographic patterned coatings are formed of a plurality of high and low index of refraction dielectric materials, arranged in multiple layers.

6. The combination of claim 5 wherein said detector or detector array photolithographic coatings patterns are parallel stripes.

7. The combination of claim 5 wherein said detector or detector array photolithographic coatings are characterized by additional optical impedance matching layers which will match the index of refraction of the upper layers of said first and second photolithographic patterned coatings to the index of refraction of the atmosphere in which the detector module is to be used.

8. A combination of:
  a. an optical thin film filter useful in the spatial and spectral separation of two or more transmitting bands of radiant energy which comprises:
    (1) a substrate having at least one surface for receiving coatings and which is substantially transparent to said radiant energy at the wavelength bands of interest;
    (2) a first coating on said substrate capable of transmitting at least two wavelength bands of interest and reflecting and/or absorbing all other out of band wavelengths; and,
  b. a detector or detector array useful in the precise detection of individual wavelength bands of radiant energy transmitted by the optical thin film filter which comprises:
    (1) a detector substrate having at least one surface for receiving coatings and which is substantially transparent to said radiant energy at the wavelength bands of interest, and having a second surface for receiving individual detectors or detector arrays;
    (2) a first photolithographic patterned coating on said detector substrate capable of reflecting all but one wavelength band of radiant energy transmitted by said first substrate coating;
    (3) a second photolithographic patterned coating on said detector substrate which is capable of transmitting at least one wavelength band transmitted by said first coating and capable of transmitting at least one wavelength band different than the wavelength band transmitted by said first photolithographic patterned coating while reflecting all other bands,
      whereby said first and second photolithographic patterned coatings are provided on a first surface of said detector substrate in discrete, abutting and non-overlapping regions;
    (4) a first detector or detector array capable of detecting at least one wavelength band of radiant energy transmitted by said first coating;
    (5) a second detector or detector array capable of detecting at least one wavelength band different than the band detected by said first detector,
      whereby said first and second detectors or detector arrays are provided on a second surface of said detector substrate in substantially parallel patterns, and whereby said detectors or detector arrays are located on a detector substrate surface opposite the photolithographic patterned coatings applied to said first detector substrate surface, and whereby said detectors are designed to precisely detect radiant energy transmitted by said photolithographic coating that is located opposite the detector or detector array and directly in the path of radiant energy bands transmitted by said first substrate coating, wherein said first and second photolithographic patterned coatings are formed of a plurality of high and low index of refraction dielectric materials, arranged in multiple layers.

9. The combination of claim 8 wherein said first and second photolithographic patterned coatings are formed of a plurality of high and low index of refraction dielectric materials, arranged in multiple layers.

10. The combination of claim 8 wherein said first and second photolithographic patterned coatings are characterized by additional optical impedance matching layers which will match the index of refraction of the upper layers of said coatings, to the atmosphere in which the detector or detector array is to be used.

* * * * *